June 18, 1957 J. W. KING 2,796,599
SIGNAL DEVICE
Filed Aug. 5, 1955
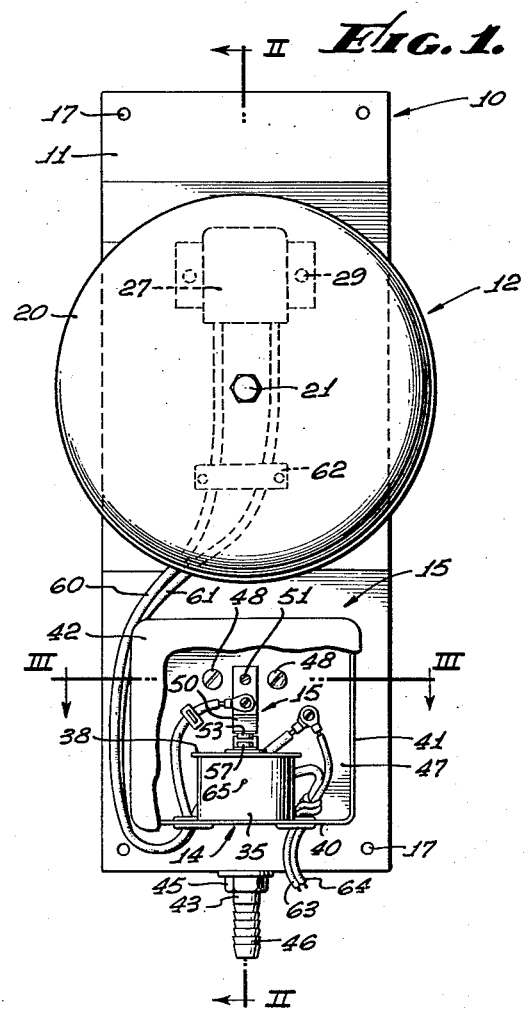
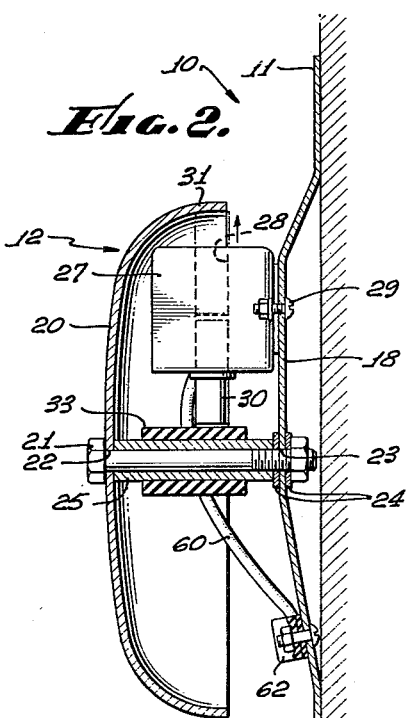
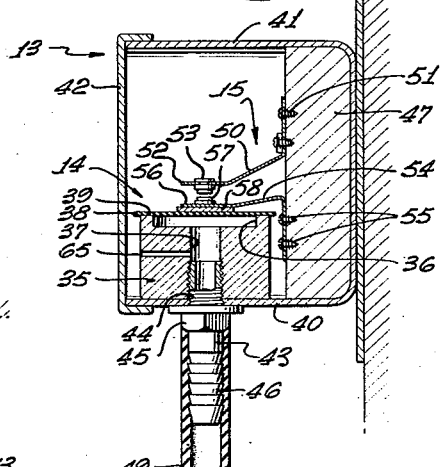
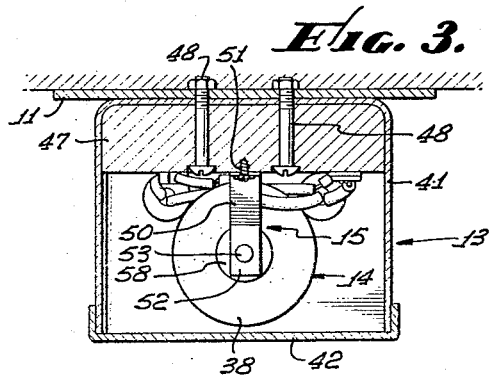
INVENTOR.
JOSEPH W. KING
BY
ATTORNEY.

United States Patent Office 2,796,599
Patented June 18, 1957

2,796,599

SIGNAL DEVICE

Joseph W. King, Highland, Calif.

Application August 5, 1955, Serial No. 526,614

3 Claims. (Cl. 340—258)

This invention relates to a signal device and, more particularly, to a signal device for use in gasoline service stations, for example, to automatically signal the arrival and presence of a customer.

Prior proposed signal devices for such use have included buzzer systems and bell systems actuated by pressure responsive means including a rubber hose adapted to be compressed by tires of a vehicle passing thereover. The compression of air in such a hose caused actuation of the signal device through a pressure responsive switch means. Such prior proposed devices known to me have included several disadvantages including the emission of a continuous signal if a tire stopped on a hose, actuation of the device by a child's foot or a bicycle passing thereover, difficulty in maintaining the pressure responsive switch means in proper condition, and lack of convenient adjustment means for regulating actuation of the signal device.

The present invention contemplates a novel improved signal device wherein the disadvantages mentioned above are obviated and wherein a gong-type bell is employed to give a one-ring signal. The invention contemplates a signal device which is so constructed and arranged that maintenance and adjustment thereof are readily performed and facilitated when needed.

The main object of this invention is to disclose and provide a signal device for use in service stations and the like which will emit a one-ring, resonant, distinctive signal.

An object of this invention is to disclose and provide a signal device which is simple and inexpensive in construction and which requires a minimum of maintenance.

Another object of this invention is to disclose and provide a signal device which may be readily adjusted so as to ring only when a gasoline-powered vehicle passes over a sensing pressure hose.

A more particular object of this invention is to disclose a signal means which employs a solenoid with a bell striker member vertically disposed and wherein in non-ringing position the striker member is seated on a sound cushioning means.

A further particular object of this invention is to disclose and provide an actuating means for the signal means which includes a pressure responsive means and electrical switch means actuated thereby and wherein switch contact members of the switch means are readily positioned and maintained in proper alignment for selected contact.

These and many other objects of this invention will be readily apparent from the following description of the drawings in which an exemplary embodiment of the invention is shown.

In the drawings:

Fig. 1 is a front view of a signal device embodying this invention, a front wall of an actuating means therefor being broken away.

Fig. 2 is a sectional view of Fig. 1 taken in a vertical plane indicated by line II—II of Fig. 1.

Fig. 3 is a sectional view taken in a horizontal transverse plane indicated by line III—III of Fig. 1.

Generally speaking, a signal device indicated at 10 comprises a base or mounting plate 11 which carries a signal means generally indicated at 12 and an actuating means 13 therefor, said actuating means 13 including a pressure responsive means 14 and electrical switch means 15. The signal device 10 is mounted in a vertical position as shown in Fig. 1 on any suitable supporting surface or wall and preferably in a sheltered location.

The base or mounting plate 11 may be made of any suitable metal plate stock and may be of elongated rectangular form. At opposite ends of plate 11 may be provided holes 17 for securing bolts or screws not shown. Intermediate ends of plate 11 may be provided an offset portion 18 to facilitate mounting of signal means 12 on said plate 11 in spaced relation to a supporting wall surface.

The signal means 12 may comprise a circular cup-shaped bell 20 of gong type and made of any suitable metal material capable of providing a distinctive ringing, resonant sound when struck by a suitable striker. The bell 20 is supported in spaced relation to offset portion 18 by a support or mounting member including a nut and bolt assembly 21 extending through an axial port 22 in said bell and an aligned port 23 in said offset portion 18. Washers 24 may be provided on opposite sides of offset portion 18 at port 23. Between inner washer 24 and bell 20 may be provided a tubular spacer sleeve member 25 having opposite ends in abutting contact with bell 20 and inner washer 24 respectively, said spacer sleeve 25 serving to hold the bell in a predetermined spaced relation to offset portion 18.

Above nut and bolt assembly 21 may be a solenoid means 27 of cylindrical form and having an axial vertically disposed through bore 28. The through bore 28 may be defined by an internal lining sleeve of any suitable material which may provide a smooth, internal, cylindrical surface of uniform diameter throughout its length. The solenoid means 27 may be suitably secured to offset portion 18 by spaced nut and bolt assemblies 29. The solenoid means includes usual solenoid coils, not illustrated, and a cylindrical striker rod or bar 30, said striker bar being freely slidable in said bore 28 in response to the electromagnetic field established by the coils.

It should be noted that the striker bar 30 has a length approximately that of the length of the solenoid means 27 and that the solenoid means 27 is positioned on the offset portion 18 so that in unenergized condition striker bar 30 extends below the solenoid means 27 for approximately one half its length. Further, the solenoid means 27 is positioned with respect to a circumferential margin 31 of the bell 20 so that when the solenoid means is energized, striker bar 30 will be lifted by the solenoid means 27 and driven upwardly therebeyond for contact with the bell margins 31.

Cushioning means 33 are provided for striker bar 30 and may include a sleeve of rubber, rubber composition, or other resilient material sleeved over spacer 25. The cushioning means 33 provides a sound-deadening means when the striker bar falls thereagainst by gravity when the solenoid means is de-energized and a selected thickness of the wall section of the cushioning sleeve also facilitates proper positioning and limiting of downward movement of the striker bar 30 with respect to the solenoid means 27.

Means to actuate signal means 12 includes the pressure responsive means 14 which may comprise a cylindrical member 35 provided with a circular recess 36 at one end thereof and a through bore 37 in communication with said recess 36, said recess 36 defining a pressure chamber for fluid, such as air. The open end of recess 36 may be covered by a diaphragm 38 made of suitable flexible resilient material such as rubber, synthetic rubbers, rubber compositions and in this example is made of neoprene. The diaphragm 38 may be secured to cylinder member 35 by a suitable adhesive or cement which bonds annular margins of the diaphragm 38 to top circular edge 39 of member 35. It has been found that by properly cleaning and preparing a neoprene diaphragm and by use of suitable well known adhesives that a bond may be made between the diaphragm and the cylinder member 35 which has greater strength than the strength of the material of the diaphragm. In this example, cylinder member 35 is made of wood, preferably a hard wood such as birch.

The cylinder member 35 is secured to a bottom wall 40 of a suitable metal receptacle 41 with a removable cover 42 by a fitting 43 which includes an externally threaded end 44 which threadedly engages member 35 in bore 37 and a nut and washer combination 45 provided intermediate ends of fitting 43 and adapted to seat against wall 40. Fitting 43 also includes an end 46 for suitable connection to a rubber pressure hose 49 of selected length which may be laid across normal path of travel of a vehicle to a pumping station.

The actuating means also includes electrical switch means 15 which in this example may be suitably mounted on a wood insert member 47 positioned in receptacle 41, said receptacle 41 being secured to the plate 11 by suitable screw bolts 48 which extend through insert member 47, receptacle 41 and the plate 11. The switch means 15 includes a switch contact member 50 of electrically conductive, resilient, spring-like metal secured to insert member 47 by suitable screws 51. The contact member 50 extends from insert member 47 at an angle and above diaphragm 38 is provided an end portion 52 parallel to diaphragm 38 and spaced above the central portion thereof. End portion 52 carries a switch contact button 53. A second resilient switch contact member 54 may be similarly connected to insert member 47 behind cylinder member 35 as by screws 55 and extends from insert member 47 and terminates in an end portion 56 parallel to and selectively spaced from end portion 52. End portion 56 carries a contact button 57 and a circular seating washer 58 which lightly rests upon the central top surface of diaphragm 38. Contact member 54 is preferably of thinner metal section than contact member 50 so that end portion 56 may be more readily responsive to movement of diaphragm 38.

The switch members 50 and 54 may be electrically connected to the solenoid means 27 by leads 60 and 61, said leads being secured intermediate their ends by a suitable insulated spacer clip 62 carried by the plate 11. Contact member 54 and the end of lead 61 may be connected respectively to a pair of leads 63 and 64 which may be connected to a suitable source of electric power, such as an outlet supplying 110 volt 60 cycle A. C.

In operation of signal device 10, passage of a wheel over rubber hose 49 laid across the path of the vehicle in the service station causes displacement of air within said hose. Such displacement causes a pressure to be exerted upwardly on diaphragm 38 which raises contact button 57 into contact with button 53. Such electrical contact results in energization of solenoid means 27 to cause the striker bar 30 to be immediately lifted and thrown above solenoid means 27 into striking contact with bell margin 31 for ringing bell 20. Contact of buttons 57 and 53 is virtually immediately broken by bleed of air in the pressure chamber recess 36 through a bleeding port 65 provided in cylinder member 35. Thus, diaphragm 38 is almost instantaneously returned to normal position. Deenergization of solenoid means 27 permits the striker bar 30 to drop by gravity through bore 28 into seating contact with cushioning means 33, said cushioning means preventing any further ringing or sound of the bell 20.

In the event a wheel stops on the driveway hose, the bell of this invention will ring only once because the bleeding port 65 will relieve the pressure in the pressure chamber recess 36 so that the diaphragm will return to normal position and the solenoid means 27 will be de-energized.

It is understood that the amount of air displaced in the rubber hose depends upon the size of the wheel contacting the hose. Adjustment of spacing of contact buttons 53 and 57 may be readily made by bending upwardly or downwardly contact member 50 so as to properly space said buttons so that diaphragm 38 will not be moved sufficiently to make electrical contact in the event a child's foot or a bicycle tire compresses the rubber hose.

It should be also noted that the button 57 will be maintained in alignment with button 53 because seating washer 58 carried thereby is positioned centrally on diaphragm 38 and the contact member 54 is secured to the insert member 47. Thus, in the event the material of the diaphragm stretches or becomes distorted, the positioning of contact button 57 is initially independent of diaphragm 38 and when said diaphragm is flexed by pressure, the seating washer covers a sufficient area to cause the button 57 to retain alignment with button 53.

It will thus be readily apparent to those skilled in the art that the signal device described above provides a one-ring signal means which is actuated by a fluid pressure means and that the pressure responsive means and electrical switch means are so arranged that a minimum of maintenance is required. It is understood that various changes and modifications may be made in construction of the signal device disclosed above and all such changes and modifications coming within the scope of the appended claims are embraced thereby.

I claim:

1. In a single response signal device, the combination of: an elongated mounting plate adapted to be vertically disposed on a supporting surface and provided with a plate portion spaced from said surface; a single support member extending away from said supporting surface and carried by said plate portion; a bell member secured at its center to the end of said support member and in spaced relation to said mounting plate; a solenoid means supported from said plate portion above said support member and extending from said plate portion to a position between an upper margin of the bell member and said support member, said solenoid means having a vertically disposed open-ended bore; a striker bar movable upwardly in said bore upon energization of said solenoid means to strike the margin of said bell member, said striker being movable out of contact with said bell margin by gravity; a sleeve member of resilient cushioning and insulating material ensleeved over said single support member and positioned beneath the bottom end of said bore to yieldably limit downward movement of the striker bar without producing sound; and actuating means to cause energization of said solenoid means and including means limited to a single response to pressure fluid variation and an electrical switch means cooperable therewith.

2. A signal device as stated in claim 1 wherein said resilient sleeve member is of selected thickness for longitudinally positioning said striker bar in selected relationship with said solenoid means.

3. In a single response signal device, the combination of: an elongated mounting plate adapted to be vertically disposed on a supporting surface and provided with a plate portion spaced from said surface; a single support member extending away from said supporting surface and carried by said plate portion; a bell member secured at its center to the end of said support member and in spaced relation to said mounting plate; a solenoid means supported from said plate portion above said support member and extending from said plate portion to a position between an upper margin of the bell member and said support member, said solenoid means having a vertically disposed open-ended bore; a striker bar movable upwardly in said bore upon energization of said solenoid means to strike the margin of said bell member, said striker being movable out of contact with said bell margin by gravity; and a sleeve member of resilient cushioning and insulating material ensleeved over said single support member and positioned beneath the bottom end of said bore to yieldably limit downward movement of the striker bar without producing sound.

References Cited in the file of this patent

UNITED STATES PATENTS

| | | |
|---|---|---|
| 1,980,194 | Ford | Nov. 13, 1934 |
| 2,060,890 | Olafson | Nov. 17, 1936 |
| 2,107,350 | Stubbins | Feb. 8, 1938 |
| 2,235,123 | Stubbins | Mar. 18, 1941 |
| 2,360,885 | Metcalf | Oct. 24, 1944 |
| 2,681,443 | Caulk | June 15, 1954 |